United States Patent
Nichols et al.

(10) Patent No.: US 7,568,005 B2
(45) Date of Patent: Jul. 28, 2009

(54) ENHANCED APPLICATION BEHAVIOR IN THE PRESENCE OF APPLICATION SHARING

(75) Inventors: David A. Nichols, Redmond, WA (US); Brian Meek, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 529 days.

(21) Appl. No.: 11/218,294

(22) Filed: Sep. 1, 2005

(65) Prior Publication Data

US 2007/0074122 A1 Mar. 29, 2007

(51) Int. Cl.
G06F 15/16 (2006.01)

(52) U.S. Cl. .................. 709/204; 709/205; 709/217; 709/218; 709/238

(58) Field of Classification Search .............. 709/204, 709/205, 217, 218, 238
See application file for complete search history.

(56) References Cited

U.S. PATENT DOCUMENTS

| | | | |
|---|---|---|---|
| 5,107,443 A | | 4/1992 | Smith et al. |
| 5,557,725 A | * | 9/1996 | Ansberry et al. ............ 715/755 |
| 5,745,711 A | | 4/1998 | Kitahara et al. |
| 5,758,110 A | | 5/1998 | Boss et al. |
| 5,760,769 A | | 6/1998 | Petrie |
| 5,790,127 A | | 8/1998 | Anderson et al. |
| 6,029,191 A | * | 2/2000 | Kurashima .................. 709/205 |
| 6,223,212 B1 | * | 4/2001 | Batty et al. .................. 709/204 |
| 6,285,363 B1 | | 9/2001 | Mairs et al. |
| 6,466,250 B1 | * | 10/2002 | Hein et al. ................ 348/14.16 |
| 6,564,246 B1 | * | 5/2003 | Varma et al. ................. 709/205 |
| 6,891,552 B1 | | 5/2005 | Bush |
| 7,356,563 B1 | * | 4/2008 | Leichtling et al. ........... 709/204 |
| 2004/0039827 A1 | | 2/2004 | Thomas et al. |
| 2004/0252185 A1 | * | 12/2004 | Vernon et al. ............. 348/14.08 |
| 2005/0033817 A1 | | 2/2005 | Wei |
| 2005/0223334 A1 | | 10/2005 | Guido et al. |
| 2006/0010392 A1 | | 1/2006 | Noel et al. |
| 2006/0167996 A1 | * | 7/2006 | Orsolini et al. ............. 709/204 |
| 2007/0074122 A1 | | 3/2007 | Nichols et al. |

OTHER PUBLICATIONS

U.S. Appl. No. 11/045,509, filed Jan. 27, 2005, Yip et al.

* cited by examiner

Primary Examiner—Ario Etienne
Assistant Examiner—Andrew Georgandellis
(74) Attorney, Agent, or Firm—Perkins Coie LLP (57) ABSTRACT

An approach for providing enhanced application behavior in the presence of application sharing is provided. An application program interface ("API") allows an application being shared in a collaborative environment to be aware of its application sharing status. An application developer can incorporate the API into an application program. Then, when an instance of the application is executing, an application sharing host can use the API to notify the instance of the application whenever the instance of the application is being shared. In addition, the application sharing host can also use the API to provide the instance of the application being shared the identity of a user that is in control of the instance of the application being shared.

19 Claims, 4 Drawing Sheets

① Identity of the user having control of the application instance.
② Application instance sets up for control by the user indicated as having control.
③ Send input controls (actions).
④ Execute the received input controls.
⑤ Send result of executing the input controls.
⑥ Identity of a new user having control of the application instance.
⑦ Application instance sets up for control by the new user indicated as having control.

```
interface IAppShareNotification {
    void appSharingEnabled( );
    void controllerChanged(hostName, UserIdentity);
    void appSharingDisabled( );
}
```

ENHANCED APPLICATION BEHAVIOR IN
THE PRESENCE OF APPLICATION
SHARING

BACKGROUND

Today's global economy demands effective worldwide communication. For example, manufacturers often have suppliers located across the country and around the world. Timely and effective communication between the manufacturer and supplier can be critical to business success. In other cases, companies often assign business projects to work groups with members physically located around the world. In some situations, the work group members can belong to different organizations and/or companies. As with manufacturers and suppliers, timely and effective communication can be critical to the success of the work group.

Face-to-face meetings have been the traditional method of communicating, but, with the organizations becoming increasing geographically dispersed, these meetings often require travel on the part of attendees and, thus, are becoming increasingly time and cost prohibitive. With proliferation of computers and the advent of the Internet, and in particular, the maturing of the World Wide Web ("web"), these meetings are increasingly taking place virtually over computer networks through the use of electronic communication technologies, such as web meeting/conferencing and application sharing.

Application sharing technologies enable a sharing user, also referred to as a "presenter," to share an application with various viewing users, also referred to as "attendees" or "participants." The display produced by the application that is executing on the presenter's computer, and which is being shared, is made available via a connection, typically through a computer network, to the attendees' computers.

Many application sharing tools or applications provide a remote control feature that allows a sharing user to give control of an application that is being shared to a viewing user at a remote computer. For example, the sharing user may pass control of the application being shared to a viewing user, whereby the viewing user's control inputs are then communicated from the viewing user's computer to the sharing user's computer. On the sharing user's computer, the actions associated with the control inputs received from the viewing user's computer are executed, and the resulting changed display is shared back out to the viewing users.

Although such remote control features are useful, both the application sharing tool and the application being shared remain unable to take full advantage of such features. This is because conventional interactive applications, which are the applications that are typically shared, expect to be used by a single user. When remote control of these applications is given to a viewing user, all the actions from the viewing user appear to have been performed by the sharing user (i.e., the user hosting the application). For example, if Alice opens a document using MICROSOFT Word on her computer and application shares it to Bob, then Bob's edits to the document will show up in the document edit history as having been made by Alice. This is because applications, such as MICROSOFT Word, are not aware that they are being application shared. Moreover, these applications are not aware of the user that is controlling the applications.

SUMMARY

An approach for providing enhanced application behavior in the presence of application sharing is provided. An application program interface ("API") allows an application being shared in a collaborative environment to be aware of its application sharing status. An application developer can incorporate the API into an application program. Then, when an instance of the application is executing, an application sharing host can use the API to notify the instance of the application whenever the instance of the application is being shared. In addition, the application sharing host can also use the API to provide the instance of the application being shared the identity of a user that is in control of the instance of the application being shared.

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

An approach for providing enhanced application behavior in the presence of application sharing is provided. In some embodiments, an API allows an application being shared in a collaborative environment to be aware of its application sharing status. An application that is aware of its application sharing status is able to adjust its behavior when being shared. An application developer can incorporate the API into an application program. Then, when an instance of the application is executing, an application sharing host, such as, by way of example, an application sharing tool, can use the API to notify the instance of the application whenever the instance of the application is being shared. In addition, the application sharing host can also use the API to provide the instance of the application being shared the identity of a user that is in control of the instance of the application being shared. In this manner, the API allows applications to become application-sharing aware applications.

In some embodiments, an instance of the application may respond to application sharing notifications by adjusting its operating behavior. For example, the instance of the application being shared can display an indication to inform the viewer that the instance of the application is currently being shared. The indication may be displayed in a user interface provided by the instance of the application being shared, such as, by way of example, a status area or title bar of the user interface.

In some embodiments, the instance of the application being shared can display an indicator that indicates the identity of the user that is controlling the instance of the application being shared—i.e., the current controller of the instance of the application being shared. The identity of the user may be displayed in an area of the user interface, such as the status area or title bar, of the instance of the application being shared.

In some embodiments, the instance of the application being shared can adjust its operating behavior by applying policies, such as, by way of example, access control policies, security policies, profiles, etc., according to the identity of the user that is controlling the instance of the application being shared. The applied policies may depend on the type of application. Stated another way, the policies may vary from one application program to another application program, depending on the type of application program and the functionality provided by the application program. For example, assuming the application is MICROSOFT Word or other comparable word processing application, the instance of the application being shared may allow read-only, annotate-only, or full-edit access to a document based on the identity of the controlling user, where:

Read-only access does not allow edits to be performed to the document. The controlling user may browse the document and direct other viewing users' attention to a part of the document, but cannot change the document.

Annotate-only access allows the controlling user to add comments to the document or edit their own comments, but the controlling user cannot edit the main text of the document or change other users' comments.

Full-edit access allows the controlling user to perform all actions including editing the document.

Other policies may include print/no print, read, write, execute, etc. Policies may also specify application settings such as, by way of example, font size, screen size, keyboard locale (e.g., character set), screen color, screen depth, etc.

In some embodiments, the instance of the application being shared can adjust its operating behavior by associating an action performed by the application program instance with the identity of the user that is controlling the instance of the application being shared. In the example of the word processing application, edits made to a document may be properly tagged or annotated with the identity of the user that was controlling the instance of the application being shared when the edits were made. The edits made to the document may be assigned different colors based on the identity of the user controlling the instance of the application being shared when the edits where made. For example, changes in, or sections of, the document may appear in different colors. In another example, a result of an action performed by the instance of the application being shared, such as, by way of example, the creation of a new document, a printout of a document, etc., may be attributed to the user that is controlling the instance of the application being shared.

In some embodiments, the instance of the application being shared can adjust its operating behavior by changing the user interface response to input. For example, when a user takes control of an instance of an application, the key bindings for the instance of the application may change to match the preferences of the current controller of the application instance.

Figure 1:
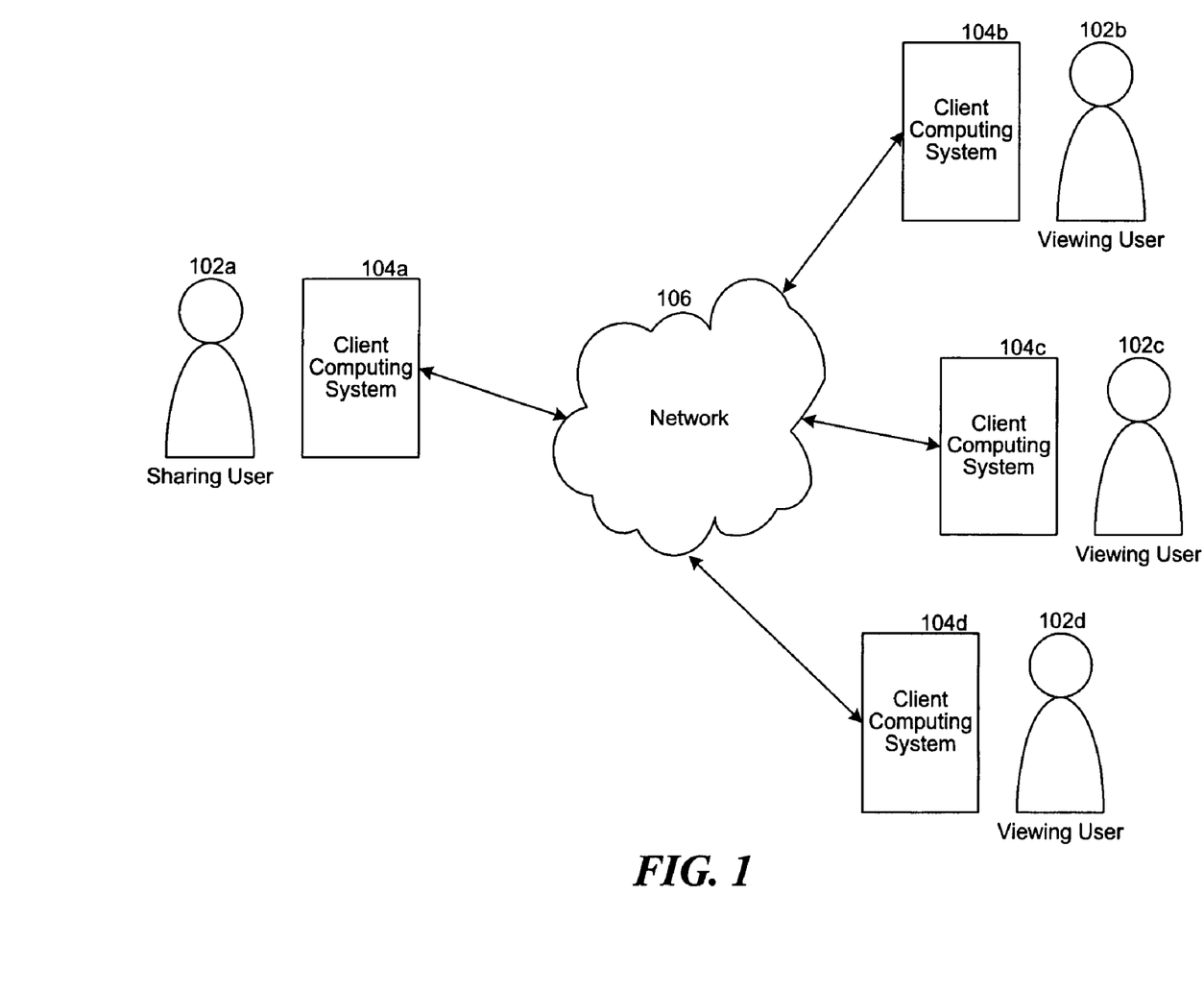
FIG. 1 is a high-level block diagram showing an environment in which an application-sharing aware application may operate.

FIG. 1 is a high-level block diagram showing an environment in which an application-sharing aware application may operate. The environment illustrates an example application sharing session and comprises a plurality of users 102a-d and a plurality of client computing systems 104a-d each coupled to a network 106. As depicted, user 102a is a sharing user and is using client computing system 104a, and users 102b-d are each viewing users using client computing systems 104b-d, respectively. As such, client computing system 104a may be referred to as a sharer computer, and client computing systems 104b-d may each be referred to as a viewer computer.

The illustrated environment is only one example of a suitable application sharing session involving an application-sharing aware application, and is not intended to suggest any limitation as to the scope of use or functionality of the described techniques. For example, the number of viewing users and viewer computers are provided only for simplicity and one skilled in the art will appreciate that there may be a different number of viewing users and viewer computers in the application sharing session. As used herein, the terms "connected," "coupled," or any variant thereof, means any connection or coupling, either direct or indirect, between two or more elements; the coupling of the connection between the elements can be physical, logical, or a combination thereof.

In general terms, the sharing user executes an application sharing program, or other suitable collaboration program that provides application sharing functionality, on the sharer computer and initiates an application sharing session with one or more participants, such as the viewing users. Each viewing user also executes a compatible application sharing program or other compatible collaboration program, on the respective viewer computer in order to participate in the application sharing session. During the application sharing session, the sharing user can invoke an instance of an application program, such as a word processing program, that is application-sharing aware on the sharer computer, and designate the instance of the application program to be shared with the other participants in the application sharing session. This causes the application sharing program executing on the sharer computer to share the output generated by the instance of the application program being shared on the sharer computer with the viewer computers. Upon sharing the instance of the application program, the application sharing program on the sharing computer can use an API supported by the application program to inform the instance of the application program that it is being shared.

While sharing the instance of the application program on the sharer computer, the sharing user can pass control of the instance of the application program being shared to a viewing user. When control of the instance of the application program being shared is passed to a viewing user, the application sharing program on the sharer computer can use the API to inform the instance of the application program being shared the identity of the viewing user that currently has control. When control is passed to a viewing user, the application sharing program executing on the viewing user's computer communicates the control inputs (i.e., the inputs made by the viewing user having control of the instance of the application program being shared) to the application sharing program executing on the sharer computer, which then communicates the received control inputs to the instance of the application program being shared. The instance of the application program being shared can then process the received control inputs based upon the identity of the viewing user that made or issued the control inputs. For example, the instance of the application program being shared can adjust its operating behavior based on the identity of the viewing user that made the control inputs. When the actions associated with the control inputs are executed, the application sharing program executing on the sharer computer shares the results of the executed actions (i.e., the resulting display generated by the application program being shared) back out to the viewer computers, including the viewer computer being used by the viewing user who has control of the instance of the application program being shared. Subsequently, when the sharing user resumes control of the instance of the application program being shared, or passes control to another viewing user, the application sharing program on the sharer computer can use the API to inform the instance of the application program being shared the identity of the user that has control. The instance of the application program being shared can then adjust its operating behavior based on the identity of the new controlling user.

In general terms, the network is a communications link that facilitates the transfer of electronic content. In one embodiment, the network includes the Internet. It will be appreciated that the network may be comprised of one or more other types of networks, such as a local area network, a wide area network, a point-to-point dial-up connection, and the like.

The computing systems, such as the sharer computer and the viewer computer, may include one or more central processing units, memory, input devices (e.g., keyboard and pointing devices), output devices (e.g., display devices), and storage devices (e.g., disk drives). The memory and storage devices are computer-readable media that may contain instructions that implement the various techniques for providing enhanced application behavior in the presence of application sharing, described herein. In addition, the data structures and message structures may be stored or transmitted via a data transmission medium, such as a signal on a communications link. Various communication links may be used, such as the Internet, a local area network, a wide area network, a point-to-point dial-up connection, a cell phone network, and so on. One of ordinary skill in the art will appreciate that the computing systems may be of various configurations having various components.

Embodiments of the described techniques may be implemented in various operating environments that include personal computers, server computers, computing devices, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computing systems may be cell phones, personal digital assistants, smart phones, personal computers, programmable consumer electronics, digital cameras, kiosks, ATMs, and so on.

The various techniques for providing enhanced application behavior in the presence of application sharing may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
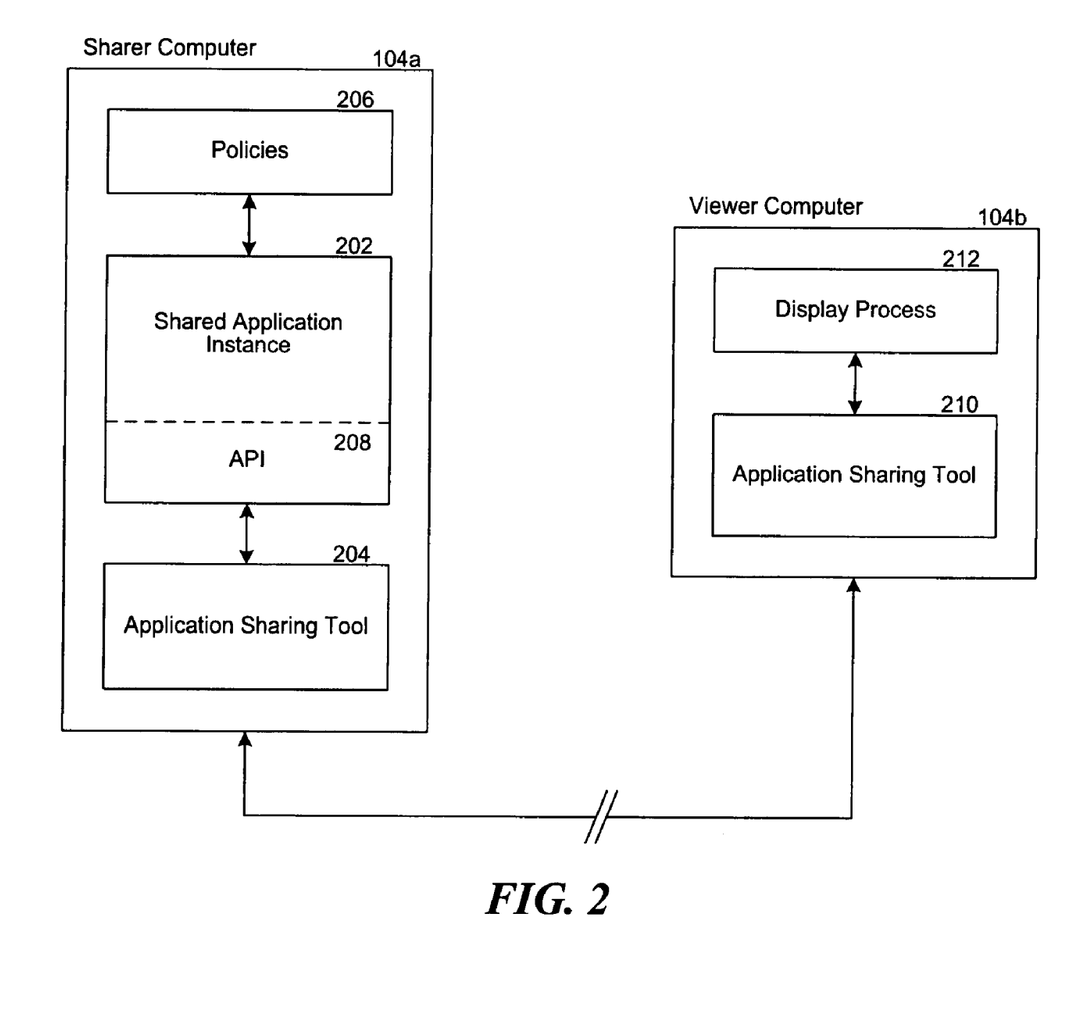
FIG. 2 is a block diagram illustrating selected components of the sharer computer coupled to the viewer compute, according to some embodiments.

FIG. 2 is a block diagram illustrating selected components of the sharer computer coupled to the viewer compute, according to some embodiments. One skilled in the art will appreciate that although only one viewer computer is illustrated in FIG. 2, this is not meant as a limitation to the actual number of viewer computers and that there can be more than one viewer computer in an application sharing session, as illustrated by way of example in FIG. 1. Moreover, even though the sharer computer is illustrated as being coupled to the viewer computer, one skilled in the art will appreciate that the sharer and viewer computers may communicate with one another through a collaboration service server computer (not depicted), which may provide collaboration bridge functionality. As depicted, the sharer computer comprises a shared application instance 202 and an application sharing tool 204, each executing on the sharer computer, and policies 206. The shared application instance provides (i.e., supports) an API 208. The viewer computer comprises an application sharing tool 210 and a display process 212, each of which is executing on the viewer computer. The aforementioned components and processes of the sharer computer and the viewer computer are only illustrative, and one skilled in the art will appreciate that the computers may include other components and processes not depicted.

The shared application instance is an invocation of an application program, such as a word processing application, a drawing or graphics application, presentation application, spreadsheet application, or other well-known interactive applications, from which information (i.e., the output display) is being shared by the application sharing tool with one or more computers, such as the viewer computers. One skilled in the art will appreciate that many shared applications can also be used in a non-shared manner. For example, a word processing application may be used by the sharing user for non-collaborative document production, and may then be used in a shared manner for group editing of the same or another document.

The API allows the shared application instance to be an application instance that is aware of its application sharing status. The API is the component that allows an application program, such as a conventional interactive application program, to become an application-sharing aware application program. The API allows the application sharing tool to communicate application sharing status and other related information to the shared application instance. The API is further discussed below.

The application sharing tool provides the application sharing functionality. The application sharing tool may be provided as a component of an application sharing application or as a component of other suitable collaboration applications. The sharing user may invoke an instance of the application sharing tool on the sharer computer to initiate application sharing of the shared application instance with, for example, the viewing user at the viewer computer. In some embodiments, the instance of the application sharing tool on the sharer computer uses the provided API to inform the application instance that it is being shared. During the application sharing of the shared application instance, the instance of the application sharing tool receives information from the shared application instance, and sends the received information to the application sharing tool executing on the viewer computer. For example, the application sharing tool may read, in a non-intrusive manner, the information sent by the shared application instance to the sharer computer's screen. On the viewer computer, the instance of the application sharing tool receives the information from the sharer computer, and sends the received information to the display process for displaying on the viewer computer's screen.

In some embodiments, the instance of the application sharing tool on the sharer computer uses the provided API to inform the shared application instance the identity of the application sharing session participant that has control of the shared application instance. For example, at the beginning of the application sharing session, the instance of the application sharing tool may use the API to identify the sharing user as the user having control of the shared application instance. When the sharing user is in control of the shared application instance, the shared application instance may receive control input from one or more input components coupled to the sharer computer, such as, by way of example, a keyboard, a mouse, etc. Subsequently, if the sharing user passes control of the shared application instance to another user, such as the viewing user, the instance of the application sharing tool on the sharer computer may use the API to identify the viewing user as the user having control of the shared application instance. When the viewing user is in control of the shared application instance, the shared application instance may receive control input from the instance of the application sharing tool on the sharer computer. In this instance, the viewing user may provide the control inputs using the input components coupled to the viewer computer, causing the instance of the application sharing tool on the viewer computer to send the control inputs to the instance of the application sharing tool on the sharer computer for processing by the shared application instance.

In some embodiments, the policies specify the security levels (e.g., access controls), profiles, rules, etc., that may be implemented by the shared application instance. The may be specified at a user-level, group-level, etc., and may provide a policy-based infrastructure for enforcing application execution decisions regarding whether the shared application instance can execute and/or how the shared application instance is to execute. The policies may be set up by administrators or the sharing user. For example, if multiple users are anticipated to have control of the shared application instance, the policies may be specified in such a way that certain users do not have authorization to perform certain functions supported by the shared application instance. As another example, the policies may be specified in such a way that the shared application instance executes using different profiles and/or settings based on the identity of the controlling user. Suitable security policies may include, by way of example: (1) a simple policy that the controlling user always gets read-only access; (2) as each user takes control, the application sharing tool could ask a user at the sharing machine (e.g., sharing user) what access to give the new controller of the shared application instance; (3) the access may be based on the file system permissions of the file being edited; (4) access may be specified in user preferences for the sharing user, explicitly naming potential controlling users or protection groups; (5) access may be determined by roles in the conferencing system that launched the application sharing session, if any (e.g., MICROSOFT LIVE MEETING distinguishes "presenters" from "attendees," and presenters may be allowed to edit, but attendees would not); and (6) access may be controlled based on the hosts the controller is coming from (e.g., only users on internal domain-connected machines are allowed to edit).

Figure 3:
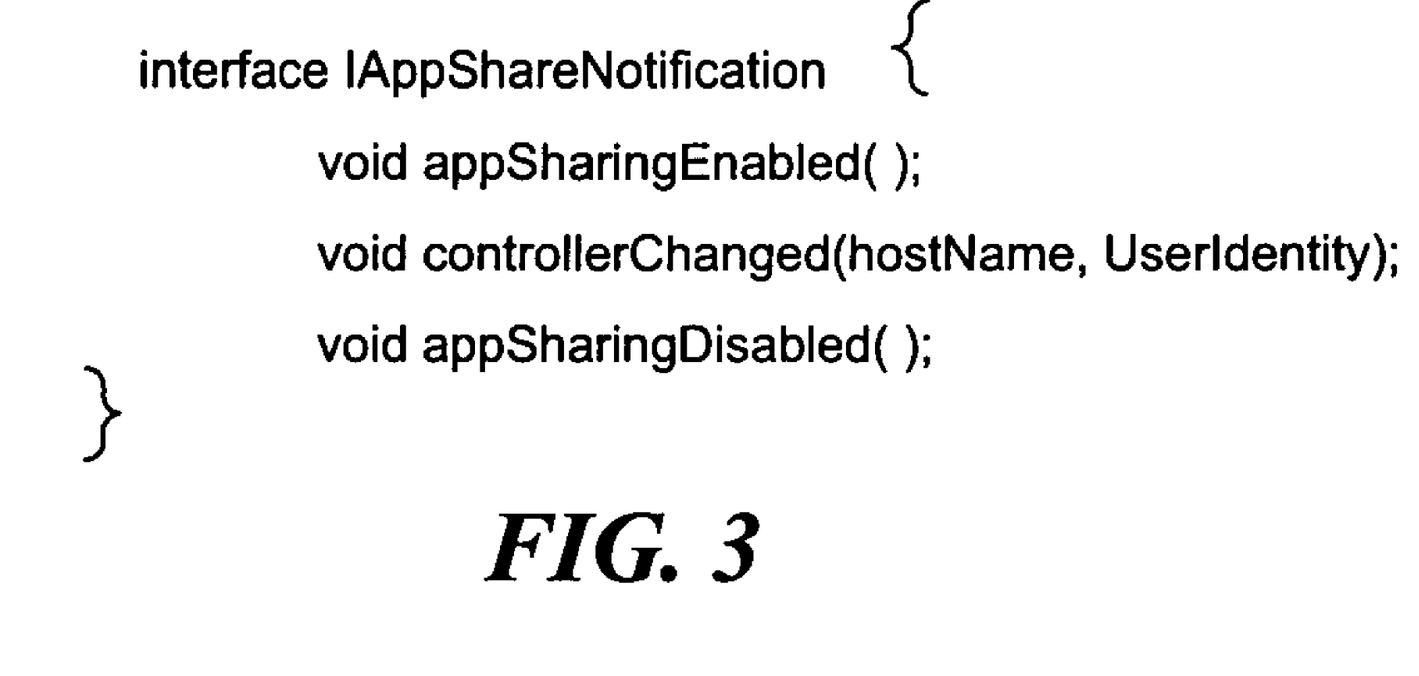
FIG. 3 is an illustration of an example API suitable for providing enhanced application behavior in the presence of application sharing, according to some embodiments.

FIG. 3 is an illustration of an example API suitable for providing enhanced application behavior in the presence of application sharing, according to some embodiments. As depicted, the API comprises three functions or methods 302, 304 and 306 for communicating, or messaging, with an application-sharing aware application program. In some embodiments, the API may be implemented as a Common Object Model (COM) interface that is exported by the application-sharing aware application. Object-oriented programming techniques, including the development of MICROSOFT'S COM interfaces, as well as other object models that provide a mechanism for communication, or messaging, between objects, such as the application-sharing aware program and the application sharing tool, are generally known to those of ordinary skill in the art of object oriented programming. In some embodiments, the API may be implemented as a communication interface using other programming techniques such as compiled program techniques, procedure call techniques, scripting techniques, RPC, etc.

In the example API depicted in FIG. 3, method 302 is an "appSharingEnabled" method that may be used to notify the application-sharing aware program that it is being shared. Method 304 is a "controllerChanged" method that has two parameters, "hostName" and "userIdentity," and which may be used to inform the application-sharing aware program the identity of the user controlling the instance of the application-sharing aware program. The "hostName" parameter is used to specify the identity of the host (i.e., the computer) on which the shared instance of the application-sharing aware program is executing. The "userIdentity" parameter is used specify the identity of the user that has control of the shared instance of the application-sharing aware program. In some embodiments, the controllerchanged method may not include the hostName parameter or the userIdentity parameter. Method 306 is an "appSharingDisabled" method that may be used to notify the application-sharing aware program that it is no longer being shared.

Figure 4:
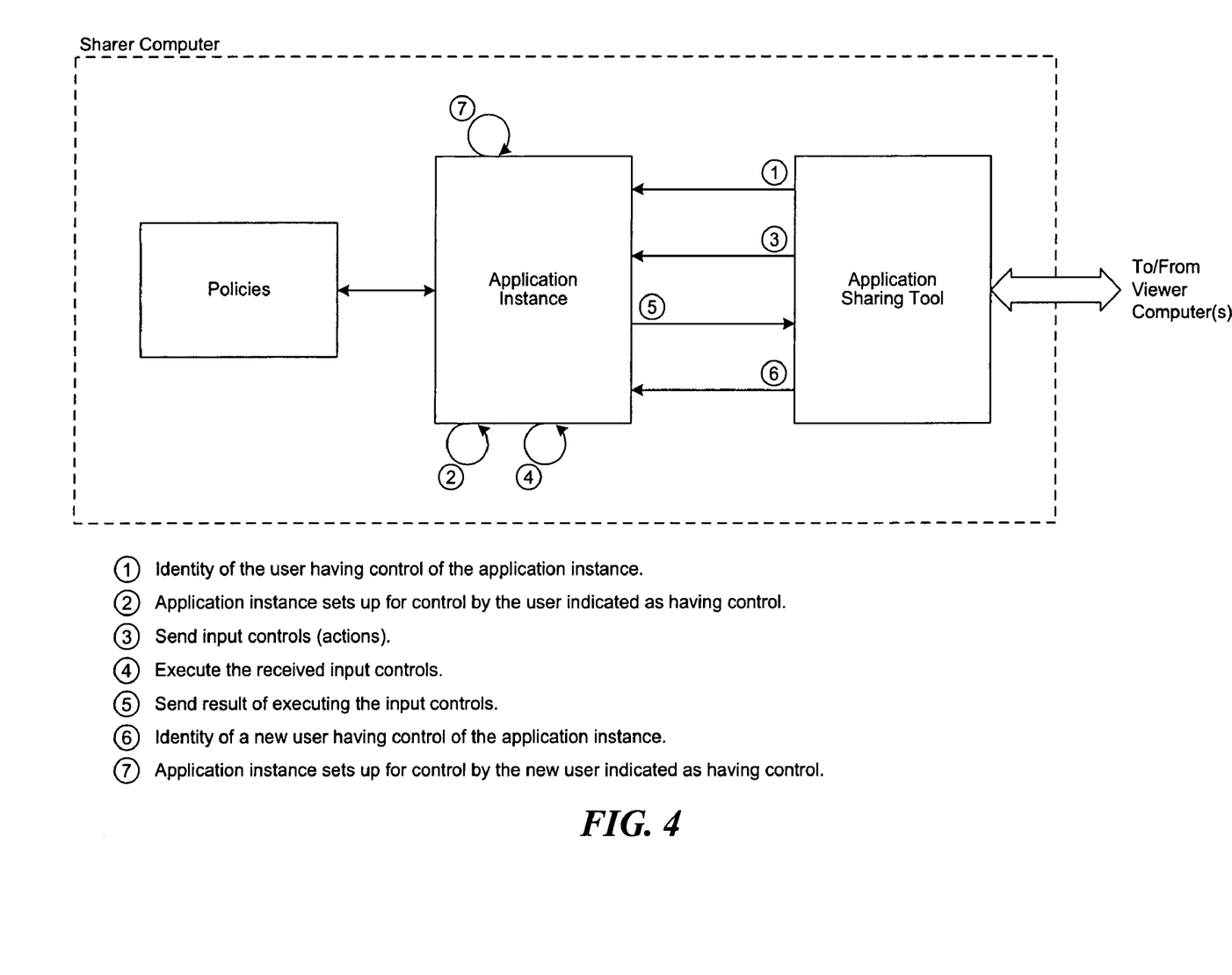
FIG. 4 is a diagram illustrating a flow of information between an application sharing tool and an instance of an application-sharing aware application, according to some embodiments.

FIG. 4 is a diagram illustrating a flow of information between an application sharing tool and an instance of an application-sharing aware application, according to some embodiments. By way of example, the sharing user may be sharing an instance of a word processing application with one or more viewing users to develop a project plan document. During the application sharing session, the sharing user may have granted a viewing user control of the word processing application instance that is being shared. Upon passing control to the viewing user, the application sharing tool provides the word processing application instance the identity of the user that has control of the word processing application instance (stage 1). Upon receiving the identity of the user that has control, the word processing application instance sets up for control by the indicated user (stage 2). For example, the word processing application may apply the policies that are appropriate for the viewing user that is identified as having control of the word processing application instance. While the viewing user has control of the word processing application, the application sharing tool receives input controls from the viewing user's computer forwards the received inputs controls to the word processing application instance (stage 3). The word processing application instance executes the received input controls made by the viewing user (stage 4). In some embodiments, the word processing application instance may perform access control checks to ensure that the viewing user is authorized to perform the actions caused by the input controls. In some embodiments, the word processing application instance attributes the results of the actions caused by the input controls to the sharing user. For example, if one of the input controls was an edit to a section of the document, the word processing application instance may identify the sharing user as the owner of the resulting edit to the document.

Upon executing an input control, the word processing application instance sends the results of executing the input control to the application sharing tool (stage 5). The application sharing tool then sends the results to the other viewer computers that are participating in the application sharing session. Subsequently, the sharing user may transfer control of the word processing application instance to another participant in the application sharing session. Upon allowing another participant to control the word processing application instance (i.e., when a different user becomes the controller of the word processing application instance), the application sharing tool provides the word processing application instance the identity of the new user that has control of the word processing application instance (stage 6). Upon receiving the identity of the new user that has control, the word processing application instance sets up for control by the indicated new user (stage 7).

One skilled in the art will appreciate that, for this and other processes and methods disclosed herein, the functions performed in the processes and methods may be implemented in differing order. Furthermore, the outlined steps are only exemplary, and some of the steps may be optional, combined with fewer steps, or expanded into additional steps.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method in a sharer computer system for providing enhanced application behavior in the presence of application sharing in which output of an application being shared is provided to viewer computer systems for display at the viewer computer systems, the method comprising:

executing an instance of an application that is being shared, the executing instance of the application performing acts that include:

receiving from an application sharing program an indication that the instance of the application is being shared and an identity of a user who is controlling the application, the application sharing program for sharing applications between the sharer computer system and the viewer computer systems; and adjusting the behavior of the instance of the application being shared according to the identity of the user that is controlling the instance of the application being shared wherein the adjusting includes changing output of the application, displaying the changed output at the sharer computer system, and displaying the changed output at the viewer computer systems wherein the adjusting of the behavior of the instance of the application according to the identity of the user who is controlling the application includes changing a user interface of the application to match a preference of the user who is controlling the application.

2. The method of claim 1, wherein adjusting the behavior of the instance of the application being shared includes applying access control to the instance of the application being shared.

3. The method of claim 1 wherein displaying the changed output includes displaying an indicator of the identity of the user that is controlling the instance of the application being shared.

4. The method of claim 3, wherein displaying the indicator includes displaying the indicator in a status area of the instance of the application being shared.

5. The method of claim 1, wherein adjusting the behavior of the instance of the application being shared includes attributing an action performed by the instance of the application being shared to the user that is controlling the instance of the application being shared.

6. The method of claim 1 wherein adjusting the behavior of the instance of the application being shared includes attributing a result of an action performed by the instance of the application being shared to the user that is controlling the instance of the application being shared.

7. The method of claim 6, wherein attributing the result of the action includes assigning a different color to the result based on the user that is controlling the instance of the application being shared.

8. The method of claim 6, wherein attributing the result of the action includes associating the result with the identity of the user that is controlling the instance of the application being shared.

9. The method of claim 1 further comprising:

under control of the instance of the application, receiving an indication that the instance of the application is no longer being shared; and identifying a user that invoked the instance of the application as the user that is controlling the instance of the application.

10. A computing system in a sharer computer having a processor and a memory for modifying behavior of an application that is being shared with a viewer computer, comprising:

an application sharing program for sharing applications between the sharer computer and the viewer computer, the application sharing program for initiating an application sharing session between the sharer computer and the viewer computer for sharing a shared application so that output of the shared application is shared with both the shared computer and the viewer computer;

notifying the shared application that it is being shared; and notifying the shared application of an identity of a user who is controlling the shared application; and the application that is to be shared, the application for upon receiving a notification that the application is being shared, adjusting the behavior of the application to inform a user that the application is being shared so that the user can determine whether the application is being shared; and adjusting the behavior of the application based on the identity of the user who is controlling the application so that the application exhibits different behaviors when different users control the application wherein the adjusting of the behavior of the application based on the identity of the user who is controlling the application includes changing a user interface of the application to match a preference of the user and wherein the application sharing program and the application that is to be shared are implemented as instructions stored in memory for execution by the processor.

11. The computing system of claim 10 wherein the adjusting of the behavior of the application based on the identity of the user who is controlling the application includes restricting access to a document opened by the application in accordance with an access control policy for the user.

12. The computing system of claim 10 wherein the adjusting of the behavior of the application based on the identity of the user who is controlling the application includes annotating operations made by the user to a document opened by the application with the identity of the user.

13. The computing system of claim 10 wherein the shared application provides an application programming interface through which the application sharing program provides notifications to the shared application.

14. The computing system of claim 10 wherein the adjusting of the behavior of the application based on the identity of the user who is controlling the application includes adjusting the behavior whenever a different user starts controlling the application.

15. A method performed by a sharer computer for modifying behavior of an application that is being shared with a viewer computer, comprising:

executing an application sharing program for sharing applications between the sharer computer and the viewer computer, the executing application sharing program performing acts that include:

initiating an application sharing session between the sharer computer and the viewer computer for sharing a shared application so that output of the shared application is shared with both the sharer computer and the viewer computer;

notifying the shared application that it is being shared; and notifying the shared application of an identity of a user who is controlling the shared application; and executing an application that is to be shared, the executing application performing acts that include:

after receiving a notification that the application is being shared, adjusting the behavior of the application to inform a user that the shared application is being shared so that the user can determine whether the application is being shared; and adjusting the behavior of the application based on the identity of the user who is controlling the application so that the application exhibits different behaviors when different users control the application wherein the adjusting of the behavior of the application based on the identity of the user who is controlling the application includes changing a user interface of the application to match a preference of the user.

16. The method of claim 15 wherein the adjusting of the behavior of the application based on the identity of the user who is controlling the application includes restricting access to a document opened by the application in accordance with an access control policy for the user.

17. The method of claim 15 wherein the adjusting of the behavior of the application based on the identity of the user who is controlling the application includes annotating operations made by the user to a document opened by the application with the identity of the user.

18. The method of claim 15 wherein the shared application provides an application programming interface through which the application sharing program provides notifications to the shared application.

19. The method of claim 15 wherein the adjusting of the behavior of the application based on the identity of the user who is controlling the application includes adjusting the behavior whenever a different user starts controlling the application.

* * * * *